(12) United States Patent
Deng

(10) Patent No.: US 10,389,155 B2
(45) Date of Patent: *Aug. 20, 2019

(54) CHARGING METHOD AND MOBILE TERMINAL

(71) Applicant: Guangdong Oppo Mobile Telecommunications Corp., Ltd., Dongguan (CN)

(72) Inventor: Nanwei Deng, Dongguan (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 131 days.

This patent is subject to a terminal disclaimer.

(21) Appl. No.: 15/561,140

(22) PCT Filed: Apr. 29, 2016

(86) PCT No.: PCT/CN2016/080819
§ 371 (c)(1),
(2) Date: Sep. 25, 2017

(87) PCT Pub. No.: WO2017/092227
PCT Pub. Date: Jun. 8, 2017

(65) Prior Publication Data
US 2018/0048163 A1     Feb. 15, 2018

(30) Foreign Application Priority Data
Dec. 3, 2015   (CN) .......................... 2015 1 0884669

(51) Int. Cl.
H02J 7/00     (2006.01)

(52) U.S. Cl.
CPC ............... *H02J 7/007* (2013.01); *H02J 7/00* (2013.01); *H02J 7/0047* (2013.01); *H02J 7/0073* (2013.01)

(58) Field of Classification Search
USPC ................................................. 320/160, 162
See application file for complete search history.

(56) References Cited

U.S. PATENT DOCUMENTS 5,442,274 A * 8/1995 Tamai ................... H02J 7/0093
320/146
5,561,360 A * 10/1996 Ayres ..................... H01M 10/44
320/129

(Continued)

FOREIGN PATENT DOCUMENTS

CN      1088718       6/1994
CN      101488591     7/2009

(Continued)

*Primary Examiner* — Samuel Berhanu
(74) *Attorney, Agent, or Firm* — Young Basile Hanlon & MacFarlane, P.C.

(57) ABSTRACT

A charging method and a mobile terminal are provided. The method includes setting an initial cut-off voltage and an initial charging current of a battery when the battery is subjected to constant current charging. The initial cut-off voltage is greater than a safe cut-off voltage of the battery. A battery voltage of the battery is detected. Whether a present value of the battery voltage is equal to the initial cut-off voltage is determined. The initial cut-off voltage and the initial charging current are gradually decreased when the present value of the battery voltage is equal to the initial cut-off voltage, until the initial cut-off voltage is less than or equal to the safe cut-off voltage, and then the battery is subjected to a constant voltage charging, where a voltage of the constant voltage charging is the safe cut-off voltage.

20 Claims, 6 Drawing Sheets

(56) References Cited

U.S. PATENT DOCUMENTS

| | | | |
|---|---|---|---|
| 5,617,007 A * | 4/1997 | Keidl | H01M 10/44 320/141 |
| 5,850,136 A | 12/1998 | Kaneko | |
| 6,087,810 A * | 7/2000 | Yoshida | H02J 7/0077 320/139 |
| 6,307,353 B1 * | 10/2001 | Shiojima | H01M 10/44 320/139 |
| 7,339,204 B2 | 3/2008 | Thomas | |
| 7,504,803 B2 * | 3/2009 | Cho | H02J 7/0093 320/139 |
| 8,258,757 B2 | 9/2012 | Chang et al. | |
| 9,293,940 B2 * | 3/2016 | Lim | H02J 7/0083 |
| 2002/0016024 A1 | 2/2002 | Thomas | |
| 2006/0043932 A1 * | 3/2006 | Nishida | H02J 7/0073 320/128 |
| 2008/0309293 A1 * | 12/2008 | Kung | H01M 10/441 320/160 |
| 2009/0153104 A1 * | 6/2009 | Matsuura | H02J 7/0091 320/153 |
| 2016/0004899 A1 | 1/2016 | Pi et al. | |
| 2017/0004343 A1 | 1/2017 | Xie et al. | |

FOREIGN PATENT DOCUMENTS

| | | |
|---|---|---|
| CN | 102237558 | 11/2011 |
| CN | 103107378 | 5/2013 |
| CN | 103490111 | 1/2014 |
| CN | 103730915 | 4/2014 |
| CN | 204595874 | 8/2015 |
| CN | 105098913 | 11/2015 |
| CN | 105449759 | 3/2016 |
| CN | 105528104 | 4/2016 |
| EP | 0851556 | 7/1998 |
| EP | 1073113 | 1/2001 |
| WO | WO 2017/092227 | 6/2017 |

\* cited by examiner

CHARGING METHOD AND MOBILE TERMINAL

RELATED APPLICATIONS

This application is a National Phase of PCT Patent Application No. PCT/CN2016/080819 having International filing date of Apr. 29, 2016, which claims the benefit of priority of Chinese Patent Application No. 201510884669.6, filed on Dec. 3, 2015. The contents of the above applications are all incorporated by reference as if fully set forth herein in their entirety.

FIELD AND BACKGROUND OF THE INVENTION

The present disclosure relates to a technical field of communication, and more particularly relates to a charging method and a mobile terminal.

Mobile terminals, such as mobile phones and tablet computers, currently use lithium batteries for power supply. Charging methods of the lithium batteries are generally classified into four stages that include trickle charging, pre-charging, constant current charging, and constant voltage charging. Since the constant current charging method uses a larger charging current, the lithium battery can be quickly charged and thus, decreasing charging time of the lithium battery. When lithium battery voltage reaches a safe cut-off voltage, the lithium battery is subjected to the constant voltage charging. In order to ensure safety of the lithium battery, the safe cut-off voltage is generally set as a fixed value and is lower than a safe voltage of the lithium battery. However, in an actual charging procedure, the lithium battery voltage measured by a power management chip is often higher than a real voltage of the lithium battery due to an internal resistance of the lithium battery. Thus, constant current charging time of the lithium battery is shorter, meanwhile constant voltage charging time of the lithium battery is extended, such that total charging time of the lithium battery is longer.

SUMMARY OF THE INVENTION

Embodiments of the present disclosure provide a charging method and a mobile terminal so that charging time of a battery can be reduced.

A first aspect of an embodiment in the present disclosure provides a charging method. The method includes:

setting an initial cut-off voltage and an initial charging current of the battery when the battery is subjected to a constant current charging, where the initial cut-off voltage is greater than a safe cut-off voltage of the battery, and a difference between the initial cut-off voltage and the safe cut-off voltage is less than or equal to a preset voltage difference;

detecting a battery voltage of the battery;

determining whether a present value of the battery voltage is equal to the initial cut-off voltage; and gradually decreasing the initial cut-off voltage and the initial charging current when the present value of the battery voltage is equal to the initial cut-off voltage, until the initial cut-off voltage is less than or equal to the safe cut-off voltage, and then the battery has a constant voltage charging, where a voltage of the constant voltage charging is the safe cut-off voltage.

In a first possible implementation of the first aspect of the embodiment in the present disclosure, the implementation of gradually decreasing the initial cut-off voltage and the initial charging current, until the initial cut-off voltage is less than or equal to the safe cut-off voltage, and a constant voltage charging of the battery, include:

decreasing the initial cut-off voltage by a first preset value to function as a present cut-off voltage, and decreasing the initial charging current by a second preset value to function as a present charging current;

determining whether the present cut-off voltage is greater than the safe cut-off voltage;

determining whether the present value of the battery voltage is equal to the present cut-off voltage when the present cut-off voltage is greater than the safe cut-off voltage; and decreasing the present cut-off voltage by the first preset value to function as a new present cut-off voltage and decreasing the present charging current by the second preset value to function as a new present charging current when the present value of the battery voltage is equal to the present cut-off voltage, and determining whether the present cut-off voltage is greater than the safe cut-off voltage until the present cut-off voltage is less than or equal to the safe cut-off voltage, and then the battery is subject to the constant voltage charging.

In combination with the first aspect of the embodiment of the present disclosure, according to a second possible implementation of the first aspect of the embodiment in the present disclosure, the method further includes:

continuously determining whether the present value of the battery voltage is equal to the initial cut-off voltage when the present value of the battery voltage is unequal to the initial cut-off voltage.

In combination with the first possible implementation of the first aspect of the embodiment of the present disclosure, according to a third possible implementation of the first aspect of the embodiment in the present disclosure, the difference between the initial cut-off voltage and the safe cut-off voltage is K times of the first preset value, where K is a positive integer.

In combination with the first aspect or any one of the first through third possible implementations of the first aspect of the embodiment of the present disclosure, according to a fourth possible implementation of the first aspect of the embodiment in the present disclosure, the implementation of setting the initial cut-off voltage and the initial charging current of the battery includes:

detecting the safe cut-off voltage of the battery;

setting the initial cut-off voltage of the battery based on a mapping relationship between the safe cut-off voltage and an initial cut-off voltage; and setting the initial charging current of the battery based on a corresponding relationship between the initial cut-off voltage and the initial charging current.

A second aspect of an embodiment in the present disclosure provides a mobile terminal. The mobile terminal includes:

a setting unit configured to set an initial cut-off voltage and an initial charging current of a battery when the battery has a constant current charging, where the initial cut-off voltage is greater than a safe cut-off voltage of the battery, and a difference between the initial cut-off voltage and the safe cut-off voltage is less than or equal to a preset voltage difference;

a detection unit configured to detect a battery voltage of the battery;

a determination unit configured to determine whether a present value of the battery voltage is equal to the initial cut-off voltage; and an adjustment unit configured to gradually decrease the initial cut-off voltage and the initial charging current when the determination unit determines that the present value of the battery voltage is equal to the initial cut-off voltage, until the initial cut-off voltage is less than or equal to the safe cut-off voltage, and then the battery is subjected to a constant voltage charging, where a voltage of the constant voltage charging is the safe cut-off voltage.

In a first possible implementation of the second aspect of the embodiment in the present disclosure, the adjustment unit includes:

a first adjustment sub-unit configured to decrease the initial cut-off voltage by a first preset value to function as a present cut-off voltage, and decrease the initial charging current by a second preset value to function as a present charging current;

a first determination sub-unit configured to determine whether the present cut-off voltage is greater than the safe cut-off voltage;

a second determination sub-unit configured to determine whether the present value of the battery voltage is equal to the present cut-off voltage when the first determination sub-unit determines that the present cut-off voltage is greater than the safe cut-off voltage; and a second adjustment sub-unit configured to decrease the present cut-off voltage by the first preset value to function as a new present cut-off voltage and decrease the present charging current by the second preset value to function as a new present charging current when the second adjustment sub-unit determines that the present value of the battery voltage is equal to the present cut-off voltage, and the second adjustment sub-unit configured to determine whether the present cut-off voltage is greater than the safe cut-off voltage until the first determination sub-unit determines that the present cut-off voltage is less than or equal to the safe cut-off voltage, and then the battery is subjected to the constant voltage charging.

In combination with the second aspect of the embodiment of the present disclosure, according to a second possible implementation of the second aspect of the embodiment in the present disclosure, the determination unit continuously determines whether the present value of the battery voltage is equal to the initial cut-off voltage when the determination unit determines that the present value of the battery voltage is unequal to the initial cut-off voltage.

In combination with the first possible implementation of the second aspect of the embodiment of the present disclosure, according to a third possible implementation of the second aspect of the embodiment in the present disclosure, the difference between the initial cut-off voltage and the safe cut-off voltage is K times of the first preset value, where K is a positive integer.

In combination with the second aspect or any one of the first through third possible implementations of the second aspect of the embodiment of the present disclosure, according to a fourth possible implementation of the second aspect of the embodiment in the present disclosure, the setting unit includes:

a detection sub-unit configured to detect the safe cut-off voltage of the battery;

a setting sub-unit configured to set the initial cut-off voltage of the battery based on a mapping relationship between the safe cut-off voltage and an initial cut-off voltage; and the setting sub-unit further configured to set the initial charging current of the battery based on a mapping relationship between the initial cut-off voltage and the initial charging current.

In the embodiments of the present disclosure, the initial cut-off voltage of the battery is set to be greater than the safe cut-off voltage of the battery, when the battery is subjected to a constant current charging. The initial cut-off voltage gradually decreases when the battery voltage reaches the initial cut-off voltage until the initial cut-off voltage is less than or equal to the safe cut-off voltage, and then the battery has a constant voltage charging. In the embodiments of the present disclosure, the initial cut-off voltage of the battery is set to be larger than the safe cut-off voltage of the battery and thus, constant current charging time increases and constant voltage charging time decreases so that total charging time of the battery can be reduced.

BRIEF DESCRIPTION OF THE SEVERAL VIEWS OF THE DRAWINGS

The following embodiments refer to the accompanying drawings for exemplifying specific implementable embodiments of the present disclosure. It should be noted that the following drawing are exemplary embodiments and persons of ordinary skill in the art, without paying any creative effort, can obtain other drawings based on these drawings, where.

DESCRIPTION OF SPECIFIC EMBODIMENTS OF THE INVENTION

The following embodiments refer to the accompanying drawings for exemplifying specific implementable embodiments of the present disclosure in a suitable computing environment, where similar numerals denote the same elements. It should be noted that the exemplary described embodiments are configured to describe and understand the present disclosure, but the present disclosure is not limited thereto.

Embodiments of the present disclosure provide a charging method and a mobile terminal so that charging time of a battery can be reduced. Details are described below.

Figure 1:
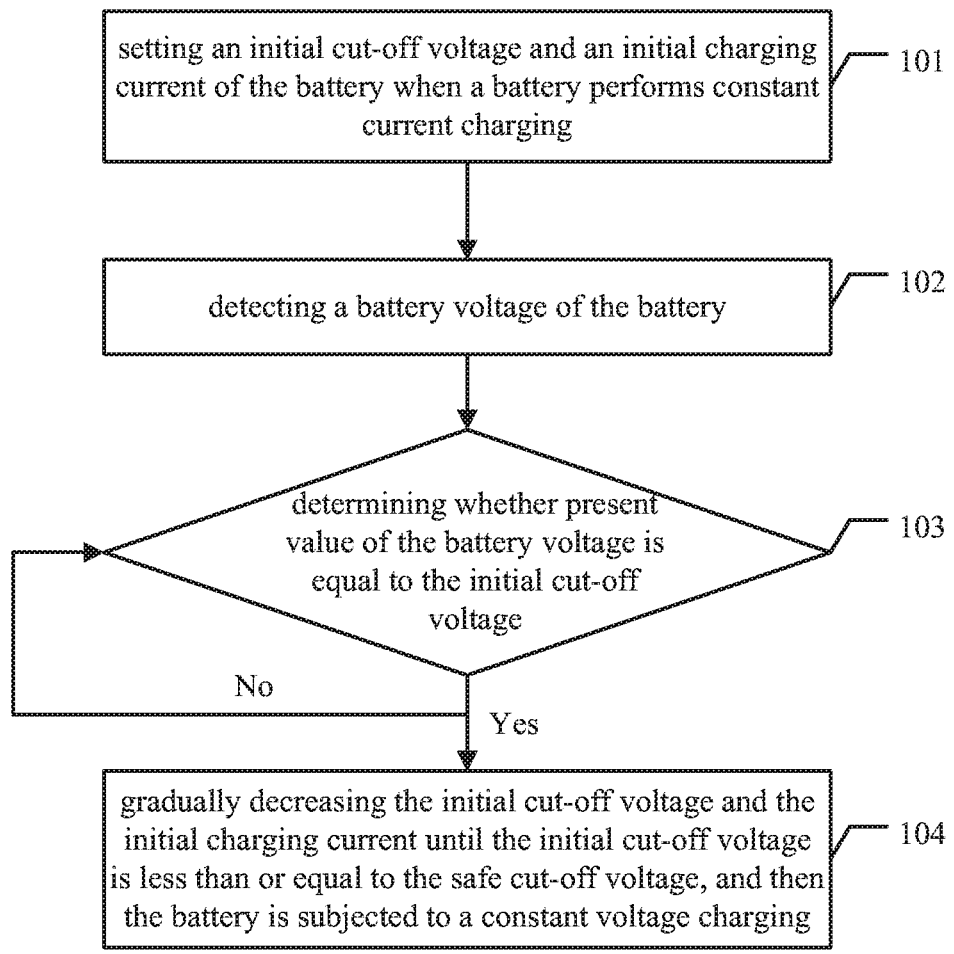
FIG. 1 is an illustrative flowchart of a charging method according to one embodiment of the present disclosure.

FIG. 1 is an illustrative flowchart of a charging method according to one embodiment of the present disclosure. As shown in FIG. 1, the charging method according to one embodiment of the present disclosure includes following action blocks.

At block 101, when the battery is subjected to constant current charging, an initial cut-off voltage and an initial charging current of the battery are set, where the initial cut-off voltage is greater than a safe cut-off voltage of the battery. A difference between the initial cut-off voltage and the safe cut-off voltage is less than or equal to a preset voltage difference.

In one embodiment of the present disclosure, a battery charging procedure are generally classified into four stages that include trickle charging, pre-charging, constant current charging, and constant voltage charging. When battery power is very low and a present value of battery voltage is low, the battery uses the trickle charging (i.e., smaller current charging). When the present value of battery voltage reaches a preset threshold, the battery is subjected to the pre-charging. When the pre-charging finishes, the battery is subjected to the constant current charging (i.e., quick charging). When the present value of battery voltage reaches a cut-off voltage, the battery is subjected to the constant voltage charging until the battery power of the battery is full. In the embodiments of the present disclosure, the charging method adjusts the cut-off voltage of the constant current charging and thus, constant current charging time increases and constant voltage charging time decreases so that total charging time of the battery can be reduced.

In one embodiment of the present disclosure, when the battery is subjected to the constant current charging, the initial cut-off voltage and the initial charging current are set. The initial cut-off voltage is defined as a cut-off voltage when the battery is subjected to the constant current charging. The initial cut-off voltage is greater than a safe cut-off voltage of the battery. The battery includes a core material and a circuit electrically connected to the core material. The safe cut-off voltage of the battery is less than a safe voltage of the battery, where the safe voltage of the battery is determined by measuring a voltage of the core material within the battery. For example, the safe voltage of the battery is selected from one group consisting of 4.3V, 4.35V and 4.4V based on voltage measurements of different types of core materials within the batteries. In one embodiment, if the safe voltage of the battery includes voltage measurement 4.3V of the core material within the battery, the safe cut-off voltage of the battery is set as 4.25V and the initial cut-off voltage of the battery is set as 4.35V. The preset voltage difference is set as a fixed value (e.g., 100 mV). For example, in order to ensure the safety of constant voltage charging, the safe cut-off voltage is less than the safe voltage of the battery by a difference 50 mV. The initial charging current is a current of the constant current charging. The initial charging current is selected from one group consisting of 800 mA, 1000 mA and 1200 mA based on different battery capacities. Higher battery capacity generally means larger initial charging current.

In at least one embodiment, the block 101 further includes the following actions.

The safe cut-off voltage of the battery is detected.

Based on a mapping relationship between the safe cut-off voltage and the initial cut-off voltage, the initial cut-off voltage of the battery is set.

Based on a mapping relationship between the initial cut-off voltage and the initial charging current, the initial charging current of the battery is set.

In one embodiment of the present disclosure, different types of core materials of the battery include safe cut-off voltages. A charging chip is used to detect the safe cut-off voltage of the battery. The mapping relationship between the safe cut-off voltage and the initial cut-off voltage is pre-stored in a mobile terminal. For example, safe cut-off voltage 4.25V corresponds to initial cut-off voltage 4.35V, safe cut-off voltage 4.3V corresponds to initial cut-off voltage 4.4V, and safe cut-off voltage 4.35V corresponds to initial cut-off voltage 4.45V. The mapping relationship between the initial cut-off voltage and the initial charging current is pre-stored in the mobile terminal. For example, the initial cut-off voltage 4.35V corresponds to the initial charging current 1000 mA, the initial cut-off voltage 4.4V corresponds to the initial charging current 1100 mA, and the initial cut-off voltage 4.45V corresponds to the initial charging current 1200 mA. In one embodiment of the present disclosure, the safe cut-off voltage of the battery is detected based on different types of core materials such that the initial cut-off voltage and the initial charging current of the battery are configured.

At block 102, a battery voltage of the battery is detected.

In one embodiment, a charging chip of the mobile terminal detects the battery voltage of the battery. It should be noted that, since the battery includes an internal resistance in a charging process, the detected battery voltage is defined as a voltage having the internal resistance and is greater than a real voltage of the battery.

At block 103, whether a present value of the battery voltage is equal to the initial cut-off voltage is determined.

In one embodiment, whether the present value of the battery voltage is equal to the initial cut-off voltage is determined. When the present value of the battery voltage is less than the initial cut-off voltage, the battery is still in the constant current charging and the action block 103 is performed. When the present value of the battery voltage is equal to the initial cut-off voltage, an action block 104 is performed.

In one embodiment, when the present value of the battery voltage is unequal to the initial cut-off voltage, the action block 103 is continuously performed.

At the block 104, the initial cut-off voltage and the initial charging current are gradually decreased until the initial cut-off voltage is less than or equal to the safe cut-off voltage, and then the battery is subjected to the constant voltage charging, where a voltage of the constant voltage charging is the safe cut-off voltage.

In one embodiment, when the present value of the battery voltage is equal to the initial cut-off voltage, the initial cut-off voltage and the initial charging current are gradually decreased. For example, the initial cut-off voltage is 4.35V, the safe cut-off voltage is 4.25V, and the initial charging current is 1000 mA. When the present value of the battery voltage is 4.35V, the initial cut-off voltage decreases to 4.34V and the initial charging current decreases to 950 mA. When the present value of the battery voltage is 4.34V, the initial cut-off voltage decreases to 4.335V and the initial charging current decreases to 925 mA. When the present value of the battery voltage is 4.335V, the initial cut-off voltage decreases to 4.32V and the initial charging current decreases to 850 mA until the present value of the battery voltage is less than or equal to 4.25V and then the battery is subjected to the constant voltage stage, where a voltage of the constant voltage stage is 4.25V. In one embodiment, the initial cut-off voltage of the battery is greater than the safe cut-off voltage. When the present value of the battery voltage is equal to the initial cut-off voltage, the initial cut-off voltage and the initial charging current are gradually decreased until the initial cut-off voltage is less than or equal to the safe cut-off voltage, and then the battery is subjected to the constant voltage stage. In one embodiment, constant current charging time of the battery increases and constant voltage charging time of the battery decreases such that total charging time of the battery can be reduced.

In one embodiment, the block 104 further includes the following actions.

The initial cut-off voltage decreases by a first preset value to function as a present cut-off voltage, and the initial charging current decreases by a second preset value to function as a present charging current.

It is determined whether the present cut-off voltage is greater than the safe cut-off voltage. If the present cut-off voltage is greater than the safe cut-off voltage, whether the present value of the battery voltage is equal to the present cut-off voltage is determined. If the present cut-off voltage is less than or equal to the safe cut-off voltage, the battery is subjected to the constant voltage charging.

It is determined whether the present value of the battery voltage is equal to the present cut-off voltage. If the present value of the battery voltage is equal to the present cut-off voltage, the present cut-off voltage decreases by the first preset value to function as a new present cut-off voltage, and the present charging current decreases by the second preset value to function as a new present charging current. If the present value of the battery voltage is unequal to the present cut-off voltage, whether the present value of the battery voltage is equal to the present cut-off voltage is continuously performed.

The present cut-off voltage decreases by the first preset value to function as a new present cut-off voltage, and the present charging current decreases by the second preset value to function as a new present charging current. Whether the present cut-off voltage is greater than the safe cut-off voltage is determined until the present cut-off voltage is less than or equal to the safe cut-off voltage, and then the battery is subjected to the constant voltage charging.

In one embodiment, the initial cut-off voltage is gradually decreased, where the initial cut-off voltage decreases by a first preset value to function as a present cut-off voltage. The initial charging current is gradually decreased, where the initial charging current decreases by a second preset value to function as a present charging current. The first preset value can be selected from one group consisting of 10 mV, 15 mV, and 25 mV. The second preset value can be selected from one group consisting of 10 mA, 20 mA, and 25 mA. For example, the first preset value can be set as 25 mV and the second preset value can be set as 25 mA.

For example, the first preset value is 25 mV and the second preset value is 25 mA, in conjunction with FIG. 2, to be described below.

Figure 2:
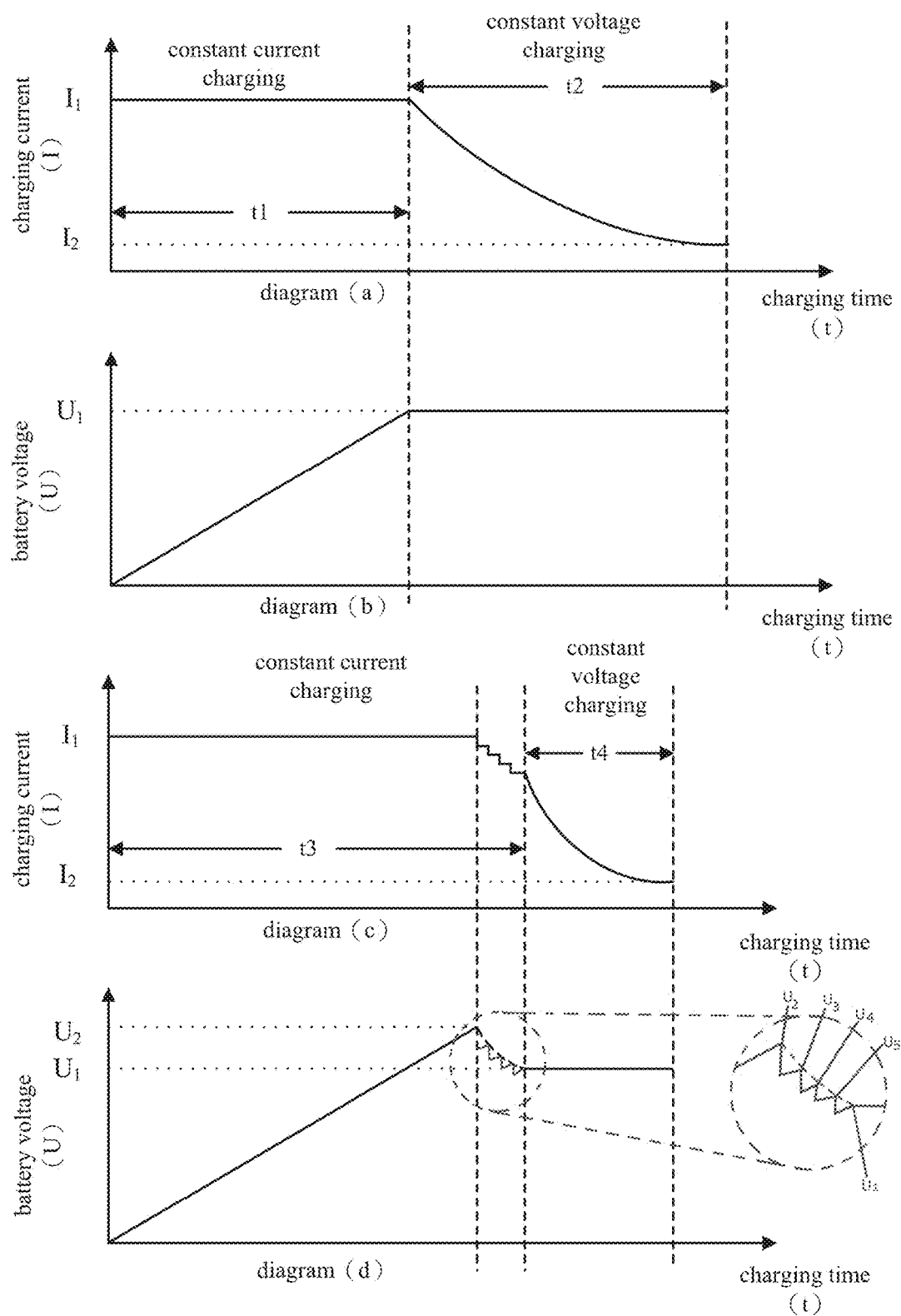
FIG. 2 is an illustrative diagram of changes of charging current and a battery voltage over charging time according to one embodiment of the present disclosure.

FIG. 2 is an illustrative diagram of changes of charging current and a battery voltage over charging time according to one embodiment of the present disclosure. As shown in FIG. 2, diagrams (a) and (b) in FIG. 2 depict the changes of charging current and the battery voltage over the charging time in a related art. Diagrams (c) and (d) depict the changes of charging current and the battery voltage over charging time according to one embodiment of the present disclosure. For illustration convenience, FIG. 2 only illustrates the constant current charging and constant voltage charging. The diagram (a) depicts the change of the charging current over the charging time in the related art. The diagram (b) depicts the change of the battery voltage over the charging time in the related art. The diagram (c) depicts the change of the charging current over the charging time according to one embodiment of the present disclosure. The diagram (d) depicts the change of the battery voltage over the charging time according to one embodiment of the present disclosure.

As shown in FIG. 2, the initial cut-off voltage (i.e., $U_2$ in diagram (d)) is 4.35V, the safe cut-off voltage (i.e., $U_1$ in diagrams (b) and (d)) is 4.25V, and the initial charging current (i.e., $I_1$ in diagrams (a) and (c)) is 1000 mA. A final charging current (i.e., $I_2$ in diagrams (a) and (c)) is provided in the constant voltage charging. In the constant current charging, as the charging time increases, the battery voltage gradually increases, where the charging current (i.e., the initial charging current) is 1000 mA. When the present value of the battery voltage reaches 4.25V (i.e., the safe cut-off voltage), the battery directly is subjected to constant voltage stage in the related art. In one embodiment of the present disclosure, since the initial cut-off voltage is set as 4.35V, the battery is continuously charged by 1000 mA. When the present value of the battery voltage reaches 4.35V, the present value of the battery voltage is equal to the initial cut-off voltage. Meanwhile, the initial cut-off voltage (4.35V) decreases by the first preset value (25 mV) to function as the present cut-off voltage (4.325V), and the initial charging current (1000 mA) decreases by the second preset value (25 mA) to function as a present charging current (975 mA). It is determined that the present cut-off voltage (4.325V) is greater than the safe cut-off voltage 4.25V. It is further determined whether the present value of the battery voltage is equal to the present cut-off voltage (4.325V). If the present value of the battery voltage is unequal to the present cut-off voltage (4.325V), whether the present value of the battery voltage is equal to the present cut-off voltage (4.325V) is continuously determined. Meanwhile, since the present value of the battery voltage increases over the charging time and when the present value of the battery voltage is equal to the present cut-off voltage (4.325V), the present cut-off voltage (4.325V) decreases by the first preset value (25 mV) to function as the present cut-off voltage (4.3V), and the present charging current (975 mA) decreases by the second preset value (25 mA) to function as a new present charging current (950 mA). In this time, the battery is charged by the new present charging current (950 mA) in the constant current charging. It is determined that the present cut-off voltage (4.3V) is greater than the safe cut-off voltage 4.25V. It is further determined whether the present value of the battery voltage is equal to the present cut-off voltage (4.3V). If the present value of the battery voltage is unequal to the present cut-off voltage (4.3V), whether the present value of the battery voltage is equal to the present cut-off voltage (4.3V) is continuously determined. When the present value of the battery voltage is equal to the present cut-off voltage (4.3V), the present cut-off voltage (4.3V) decreases by the first preset value (25 mV) to function as the present cut-off voltage (4.275V), and the present charging current (950 mA) decreases by the second preset value (25 mA) to function as a new present charging current (925 mA). In this time, the battery is charged by the new present charging current (925 mA) in the constant current charging. It is determined that the present cut-off voltage (4.275V) is greater than the safe cut-off voltage 4.25V. It is further determined whether the present value of the battery voltage is equal to the present cut-off voltage (4.275V). If the present value of the battery voltage is unequal to the present cut-off voltage (4.275V), whether the present value of the battery voltage is equal to the present cut-off voltage (4.275V) is continuously determined. When the present value of the battery voltage is equal to the present cut-off voltage (4.275V), the present cut-off voltage (4.275V) decreases by the first preset value (25 mV) to function as the present cut-off voltage (4.25V), and the present charging current (925 mA) decreases by the second preset value (25 mA) to function as a new present charging current (900 mA). In this time, the battery is charged by the new present charging current (900 mA) in the constant current charging. It is determined that the present cut-off voltage (4.25V) is equal to the safe cut-off voltage 4.25V. In this time, the battery is subjected to the constant voltage charging. As shown in FIG. 2, the charging time of the constant current charging is t1 and the charging time of the constant voltage charging is t2 in the related art. In one embodiment of the present disclosure, the charging time of the constant current charging is t3 and the charging time of the constant voltage charging is t4. Although the charging time t3 is greater than the charging time t3, however, the charging time t4 is significantly less than the charging time t2. While charging the battery having same battery capacity, total charging time (t1+t2) is greater than total charging time (t3+t4) and thus, the total charging time of the battery effectively is reduced according to one embodiment of the present disclosure.

In one embodiment, the difference between the initial cut-off voltage and the safe cut-off voltage is K times of the first preset value, where K is a positive integer.

For example, when the initial cut-off voltage is 4.35V and the safe cut-off voltage is 4.25V, the first preset value is set as 10 mV. The difference between the initial cut-off voltage and the safe cut-off voltage is 100 mV. Thus, the difference between the initial cut-off voltage and the safe cut-off voltage is ten times of the first preset value.

In the embodiments of the present disclosure, when the battery is subjected to a constant current charging, an initial cut-off voltage and an initial charging current of the battery are set, where the initial cut-off voltage is greater than the safe cut-off voltage of the battery. The difference between the initial cut-off voltage and the safe cut-off voltage is less than or equal to a preset voltage difference. The battery voltage of the battery is detected. It is determined whether the present value of the battery voltage is equal to the initial cut-off voltage. When the present value of the battery voltage is equal to the initial cut-off voltage, the initial cut-off voltage and the initial charging current are gradually decreased until the initial cut-off voltage is less than or equal to the safe cut-off voltage, and then the battery is subjected to the constant voltage stage, where a voltage of the constant voltage stage is the safe cut-off voltage. In one embodiment, when the initial cut-off voltage is greater than the safe cut-off voltage of the battery, the constant current charging time of the battery increases and the constant voltage charging time of the battery decreases such that total charging time of the battery can be reduced.

Figure 3:
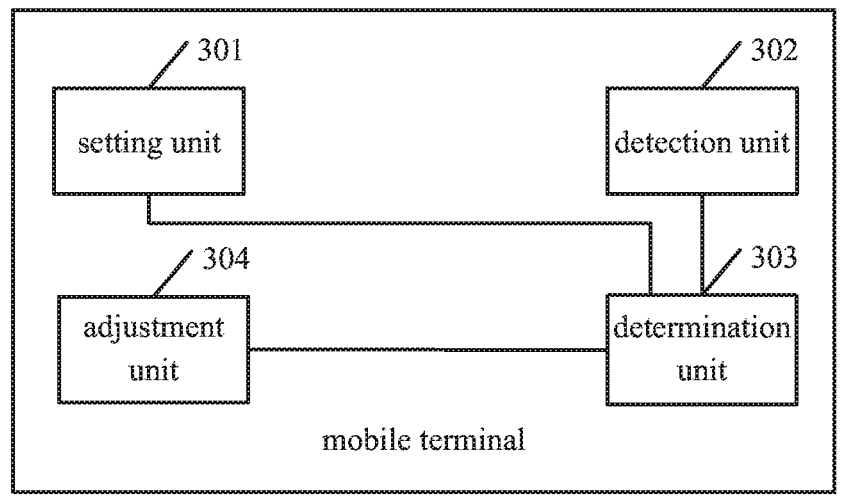
FIG. 3 is an illustrative structural diagram of a mobile terminal according to one embodiment of the present disclosure.

FIG. 3 is an illustrative structural diagram of a mobile terminal according to one embodiment of the present disclosure. As shown in FIG. 3, the mobile terminal includes a setting unit 301, a detection unit 302, a determination unit 303, and an adjustment unit 304.

The setting unit 301 is configured to set an initial cut-off voltage and an initial charging current of the battery when a battery is subjected to a constant current charging, where the initial cut-off voltage is greater than a safe cut-off voltage of the battery. A difference between the initial cut-off voltage and the safe cut-off voltage is less than or equal to a preset voltage difference.

Figure 4:
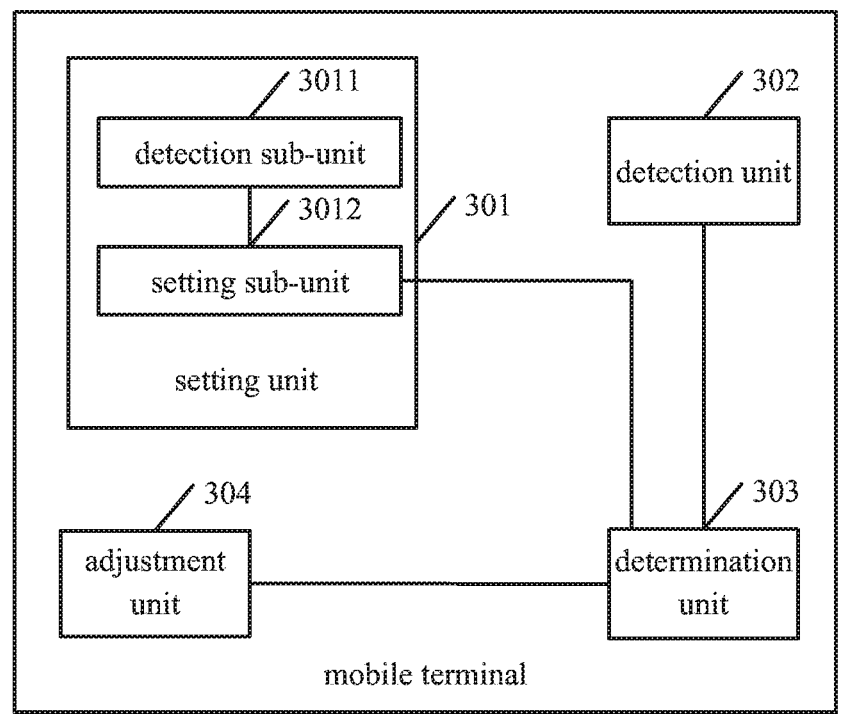
FIG. 4 is an illustrative structural diagram of a mobile terminal according to another embodiment of the present disclosure.

In one embodiment, as shown in FIG. 4, the setting unit 301 further includes a detection sub-unit 3011 and a setting sub-unit 3012.

The detection sub-unit 3011 is configured to detect the safe cut-off voltage of the battery.

The setting sub-unit 3012 is configured to set the initial cut-off voltage of the battery based on a mapping relationship between the safe cut-off voltage and an initial cut-off voltage.

The setting sub-unit 3012 is further configured to set the initial charging current of the battery based on a mapping relationship between the initial cut-off voltage and an initial charging current.

In one embodiment of the present disclosure, different types of core materials of the battery include safe cut-off voltages. The detection sub-unit 3011 controls a charging chip that detects the safe cut-off voltage of the battery. The mapping relationship between the safe cut-off voltage and the initial cut-off voltage is pre-stored in a mobile terminal. For example, safe cut-off voltage 4.25V corresponds to initial cut-off voltage 4.35V, safe cut-off voltage 4.3V corresponds to initial cut-off voltage 4.4V, and safe cut-off voltage 4.35V corresponds to initial cut-off voltage 4.45V. The mapping relationship between the initial cut-off voltage and the initial charging current is pre-stored in the mobile terminal. For example, the initial cut-off voltage 4.35V corresponds to the initial charging current 1000 mA, the initial cut-off voltage 4.4V corresponds to the initial charging current 1100 mA, and the initial cut-off voltage 4.45V corresponds to the initial charging current 1200 mA. The setting sub-unit 3012 sets the initial cut-off voltage of the battery based on a mapping relationship between the safe cut-off voltage and an initial cut-off voltage. The setting sub-unit 3012 further set the initial charging current of the battery based on a mapping relationship between the initial cut-off voltage and an initial charging current. In one embodiment of the present disclosure, the setting sub-unit 3012 detects the safe cut-off voltage of the battery based on different types of core materials such that the initial cut-off voltage and the initial charging current of the battery are configured.

The detection unit 302 is configured to detect battery voltage of the battery.

In one embodiment, the detection unit 302 controls a charging chip of the mobile terminal that detects the battery voltage of the battery. It should be noted that, since an internal resistance exists in the battery during a charging, the detected battery voltage is defined as a voltage having an internal resistance and is greater than a real voltage of the battery.

The determination unit 303 determines whether a present value of the battery voltage is equal to the initial cut-off voltage.

In one embodiment, the determination unit 303 determines whether the present value of the battery voltage is equal to the initial cut-off voltage. When the present value of the battery voltage is less than the initial cut-off voltage, the battery is still in the constant current charging. The determination unit 303 continuously determines whether the present value of the battery voltage is equal to the initial cut-off voltage. When the determination unit 303 determines that the present value of the battery voltage is equal to the initial cut-off voltage, the adjustment unit 304 is triggered. When the determination unit 303 determines that the present value of the battery voltage is unequal to the initial cut-off voltage, the determination unit 303 continuously determines whether the present value of the battery voltage is equal to the initial cut-off voltage.

When the present value of the battery voltage is equal to the initial cut-off voltage, the adjustment unit 304 is configured to gradually decrease the initial cut-off voltage and the initial charging current until the initial cut-off voltage is less than or equal to the safe cut-off voltage, and then the battery is subjected to the constant voltage charging, where a voltage of the constant voltage charging is the safe cut-off voltage.

In one embodiment, when the present value of the battery voltage is equal to the initial cut-off voltage, the adjustment unit 304 gradually decreases the initial cut-off voltage and the initial charging current. For example, the initial cut-off voltage is 4.35V, the safe cut-off voltage is 4.25V, and the initial charging current is 1000 mA. When the present value of the battery voltage is 4.35V, the adjustment unit 304 adjusts the initial cut-off voltage to 4.34V and adjusts the initial charging current to 950 mA. When the present value of the battery voltage is 4.34V, the adjustment unit 304 adjusts the initial cut-off voltage to 4.335V and adjusts the initial charging current to 925 mA. When the present value of the battery voltage is 4.335V, the adjustment unit 304 adjusts the initial cut-off voltage to 4.32V and adjusts the initial charging current to 850 mA until the present value of the battery voltage is less than or equal to 4.25V and then the battery is subjected to the constant voltage stage, where a voltage of the constant voltage stage is 4.25V. In one embodiment, the setting unit 301 configures that the initial cut-off voltage of the battery is greater than the safe cut-off voltage. When the present value of the battery voltage is equal to the initial cut-off voltage, the adjustment unit 304 gradually decreases the initial cut-off voltage and the initial charging current until the initial cut-off voltage is less than or equal to the safe cut-off voltage, and then the battery is subjected to the constant voltage stage. In one embodiment, the constant current charging time of the battery increases and constant voltage charging time of the battery decreases such that total charging time of the battery can be reduced.

Figure 5:
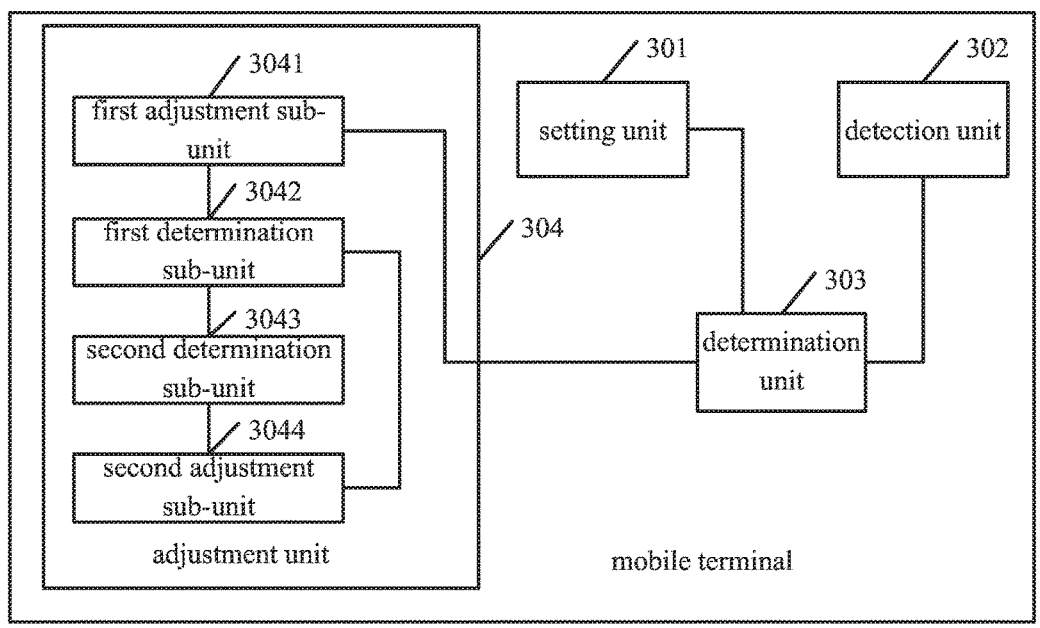
FIG. 5 is an illustrative structural diagram of a mobile terminal according to another embodiment of the present disclosure.

In one embodiment, as shown in FIG. 5, the adjustment unit 304 includes a first adjustment sub-unit 3041, a first determination sub-unit 3042, a second determination sub-unit 3043, and a second adjustment sub-unit 3044.

The first adjustment sub-unit 3041 is configured to decrease the initial cut-off voltage by a first preset value to function as a present cut-off voltage, and decreases the initial charging current by a second preset value to function as a present charging current.

The first determination sub-unit 3042 is configured to determine whether the present cut-off voltage is greater than the safe cut-off voltage.

The second determination sub-unit 3043 is configured to determine whether the present value of the battery voltage is equal to the present cut-off voltage when the first determination sub-unit 3042 determines that the present cut-off voltage is greater than the safe cut-off voltage.

The second adjustment sub-unit 3044 is configured to decrease the present cut-off voltage by the first preset value to function as a new present cut-off voltage, and decreases the present charging current by a second preset value to function as a new present charging current when the second determination sub-unit 3043 determines that the present value of the battery voltage is equal to the present cut-off voltage. The second adjustment sub-unit 3044 triggers the first determination sub-unit 3042 to determine whether the present cut-off voltage is greater than the safe cut-off voltage until the first determination sub-unit 3042 determines that the present cut-off voltage is less than or equal to the safe cut-off voltage, and then the battery is subjected to the constant voltage charging.

In one embodiment, the adjustment unit 304 gradually decreases the initial cut-off voltage, where the adjustment sub-unit 3041 decreases the initial cut-off voltage by a first preset value to function as a present cut-off voltage. The adjustment unit 304 gradually decreases the initial charging current, where the adjustment sub-unit 3041 decreases the initial charging current by a second preset value to function as a present charging current. The first preset value can be selected from one group consisting of 10 mV, 15 mV, and 25 mV. The second preset value can be selected from one group consisting of 10 mA, 20 mA, and 25 mA. For example, the first preset value can be set as 25 mV and the second preset value can be set as 25 mA.

For example, the first preset value is 25 mV and the second preset value is 25 mA, in conjunction with FIG. 2, to describe the blocks 1041 through 1044 below.

FIG. 2 is an illustrative diagram of changes of charging current and a battery voltage over charging time according to one embodiment of the present disclosure. As shown in FIG. 2, diagrams (a) and (b) in FIG. 2 depict the changes of charging current and the battery voltage over the charging time in a related art. Diagrams (c) and (d) depict the changes of charging current and the battery voltage over charging time according to one embodiment of the present disclosure. For illustration convenience, FIG. 2 only illustrates the constant current charging and constant voltage charging. The diagram (a) depicts the change of the charging current over the charging time in the related art. The diagram (b) depicts the change of the battery voltage over the charging time in the related art. The diagram (c) depicts the change of the charging current over the charging time according to one embodiment of the present disclosure. The diagram (d) depicts the change of the battery voltage over the charging time according to one embodiment of the present disclosure.

As shown in FIG. 2, the initial cut-off voltage (i.e., $U_2$ in diagram (d)) is 4.35V, the safe cut-off voltage (i.e., $U_1$ in diagrams (b) and (d)) is 4.25V, and the initial charging current (i.e., $I_1$ in diagrams (a) and (c)) is 1000 mA. A final charging current (i.e., $I_2$ in diagrams (a) and (c)) is provided in the constant voltage charging. In the constant current charging, as the charging time increases, the battery voltage gradually increases from an initial voltage value (i.e., termed as $U_0$) that is greater than zero volts, where the charging current (i.e., the initial charging current) is 1000 mA. When the present value of the battery voltage reaches 4.25V (i.e., the safe cut-off voltage), the battery directly is subjected to constant voltage stage in the related art. In one embodiment of the present disclosure, since the initial cut-off voltage is set as 4.35V (i.e., $U_2$), the battery is continuously charged by 1000 mA. When the present value of the battery voltage reaches 4.35V, the present value of the battery voltage is equal to the initial cut-off voltage. Meanwhile, the adjustment sub-unit 3041 decreases the initial cut-off voltage (4.35V) by the first preset value (25 mV) to function as the present cut-off voltage (4.325V, e.g., termed as $U_3$), and decreases the initial charging current (1000 mA) by the second preset value (25 mA) to function as a present charging current (975 mA) so that the present value of the battery voltage can be gradually decreased. The first determination sub-unit 3042 determines that the present cut-off voltage (4.325V) is greater than the safe cut-off voltage 4.25V. The second determination sub-unit 3043 determines whether the present value of the battery voltage is equal to the present cut-off voltage (4.325V). If the present value of the battery voltage is unequal to the present cut-off voltage (4.325V), the second determination sub-unit 3043 continuously determines whether the present value of the battery voltage is equal to the present cut-off voltage (4.325V). Meanwhile, since the present value of the battery voltage increases over the charging time and when the second determination sub-unit 3043 continuously determines that the present value of the battery voltage is equal to the present cut-off voltage (4.325V), the second adjustment sub-unit 3044 decreases the present cut-off voltage (4.325V) by the first preset value (25 mV) to function as the present cut-off voltage (4.3V, e.g., termed as $U_4$), and decreases the present charging current (975 mA) by the second preset value (25 mA) to function as a new present charging current (950 mA) so that the present value of the battery voltage can be gradually decreased. In this time, the battery is charged by the new present charging current (950 mA) in the constant current charging. The first determination sub-unit 3042 continuously determines that the present cut-off voltage (4.3V) is greater than the safe cut-off voltage 4.25V. The second determination sub-unit 3043 further determines whether the present value of the battery voltage is equal to the present cut-off voltage (4.3V). If the present value of the battery voltage is unequal to the present cut-off voltage (4.3V), the second determination sub-unit 3043 continuously determines whether the present value of the battery voltage is equal to the present cut-off voltage (4.3V). When the present value of the battery voltage is equal to the present cut-off voltage (4.3V), the second adjustment sub-unit 3044 decreases the present cut-off voltage (4.3V) by the first preset value (25 mV) to function as the present cut-off voltage (4.275V, e.g., termed as $U_5$), and decreases the present charging current (950 mA) by the second preset value (25 mA) to function as a new present charging current (925 mA) so that the present value of the battery voltage can be gradually decreased. In this time, the battery is charged by the new present charging current (925 mA) in the constant current charging. The first determination sub-unit 3042 continuously determines that the present cut-off voltage (4.275V) is greater than the safe cut-off voltage 4.25V (i.e., $U_1$).

In one embodiment, the difference between the initial cut-off voltage and the safe cut-off voltage is K times of the first preset value, where K is a positive integer.

For example, when the initial cut-off voltage is 4.35V and the safe cut-off voltage is 4.25V, the setting unit 301 sets the first preset value as 10 mV. The difference between the initial cut-off voltage and the safe cut-off voltage is 100 mV. Thus, the difference between the initial cut-off voltage and the safe cut-off voltage is ten times of the first preset value.

In the embodiments of the present disclosure, when the battery is subjected to constant current charging, the setting unit 301 sets an initial cut-off voltage and an initial charging current of the battery, where the initial cut-off voltage is greater than the safe cut-off voltage of the battery. The difference between the initial cut-off voltage and the safe cut-off voltage is less than or equal to a preset voltage difference. The detection unit 302 detects the battery voltage of the battery. The determination unit 303 determines whether the present value of the battery voltage is equal to the initial cut-off voltage. When the present value of the battery voltage is equal to the initial cut-off voltage, the adjustment unit 304 gradually decreases the initial cut-off voltage and the initial charging current until the initial cut-off voltage is less than or equal to the safe cut-off voltage, and then the battery is subjected to the constant voltage stage, where a voltage of the constant voltage stage is the safe cut-off voltage. In one embodiment, when the setting unit 301 configures that the initial cut-off voltage is greater than the safe cut-off voltage of the battery, the constant current charging time of the battery increases and the constant voltage charging time of the battery decreases such that total charging time of the battery can be reduced.

Figure 6:
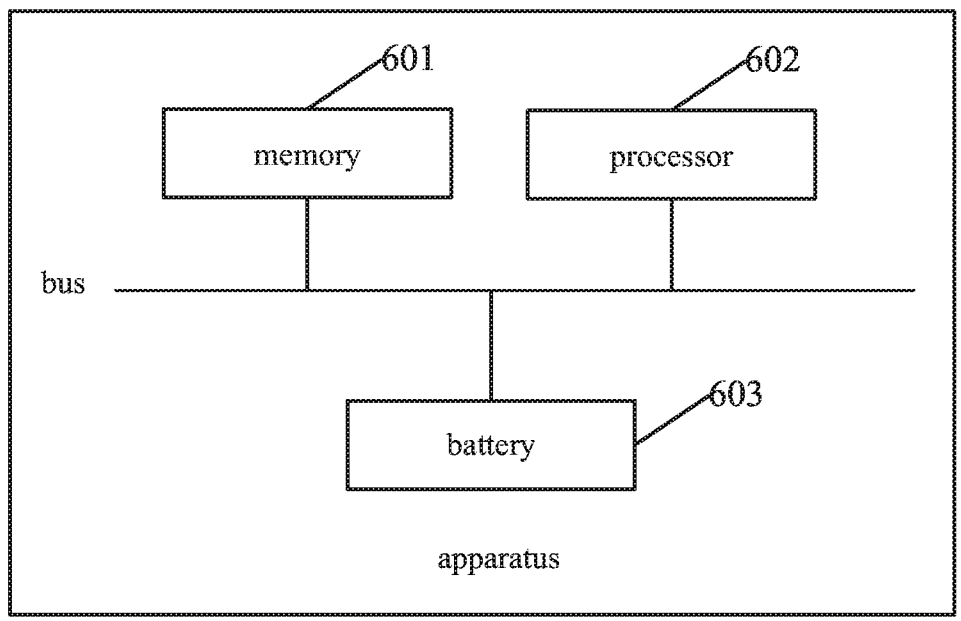
FIG. 6 is yet another illustrative structural diagram of a mobile terminal according to another embodiment of the present disclosure.

FIG. 6 is yet another illustrative structural diagram of an apparatus (e.g., a mobile terminal) according to another embodiment of the present disclosure. The apparatus can be a part of a mobile terminal or an electronic device. The apparatus also can be an entire mobile terminal or an entire other electronic device with function of charging method. As shown in FIG. 6, the apparatus includes a memory 601, at least one processor 602, and a battery 603, where the at least one processor 602 may be one or more processors and one processor is shown in FIG. 6. In one embodiment, the memory 601, the at least one processor 602, and the battery 603 are connected using a bus (as shown in FIG. 6) or different connections. The memory 601 is configured to store program instructions. The at least one processor 602 is configured to call program instructions in the memory 601 and executes following operations.

When the battery 603 is subjected to constant current charging, an initial cut-off voltage and an initial charging current of the battery 603 are set, where the initial cut-off voltage is greater than a safe cut-off voltage of the battery. A difference between the initial cut-off voltage and the safe cut-off voltage is less than or equal to a preset voltage difference.

A battery voltage of the battery 603 is detected.

Whether a present value of the battery voltage is equal to the initial cut-off voltage is determined.

When the present value of the battery voltage is equal to the initial cut-off voltage, the initial cut-off voltage and the initial charging current are gradually decreased until the initial cut-off voltage is less than or equal to the safe cut-off voltage, and then the battery 603 is subjected to the constant voltage charging, where a voltage of the constant voltage charging is the safe cut-off voltage.

In one embodiment, the at least one processor 602 gradually decreases the initial cut-off voltage and the initial charging current until the initial cut-off voltage is less than or equal to the safe cut-off voltage, and then the battery 603 is subjected to the constant voltage charging. The at least one processor 602 performs the following operations.

The initial cut-off voltage decreases by a first preset value to function as a present cut-off voltage, and the initial charging current decreases by a second preset value to function as a present charging current.

Whether the present cut-off voltage is greater than the safe cut-off voltage is determined.

When the present cut-off voltage is greater than the safe cut-off voltage, whether the present value of the battery voltage of the battery 603 is equal to the present cut-off voltage is determined.

When the present value of the battery voltage of the battery 603 is equal to the present cut-off voltage, the present cut-off voltage decreases by the first preset value to function as a new present cut-off voltage, and the present charging current decreases by a second preset value to function as a new present charging current. It is determined whether the present cut-off voltage is greater than the safe cut-off voltage until the present cut-off voltage is less than or equal to the safe cut-off voltage, and then the battery 603 is subjected to the constant voltage charging.

In one embodiment, the at least one processor 602 performs the following operations.

When the present value of the battery voltage of the battery 603 is unequal to the present cut-off voltage, whether the present value of the battery voltage of the battery 603 is equal to the present cut-off voltage is continuously determined.

In one embodiment, the difference between the initial cut-off voltage and the safe cut-off voltage is K times of the first preset value, where K is a positive integer.

That the at least one processor 602 sets an initial cut-off voltage and an initial charging current of the battery 603 includes the following operations.

A battery voltage of the battery 603 is detected.

Based on a mapping relationship between the safe cut-off voltage and an initial cut-off voltage, the initial cut-off voltage of the battery 603 is set.

Based on a mapping relationship between the initial cut-off voltage and an initial charging current, the initial charging current of the battery 603 is set.

In one embodiment, the apparatus in FIG. 6 increases the constant current charging time of the battery and decreases constant voltage charging time of the battery such that total charging time of the battery can be reduced.

Persons skilled in the related art should be noted that all or part of actions in the above-described embodiments can be implemented by program instructions executable in hardware. The program instructions are stored in computer-readable medium, where the "computer-readable medium" includes flash disks, a read-only memory (ROM), a random access memory (RAM), magnetic devices, and optic devices.

A charging method and a terminal according to the above-mentioned embodiments of the present disclosure are clearly described. As is understood by a person skilled in the art, the foregoing preferred embodiments of the present disclosure are illustrative rather than limiting of the present disclosure. It is intended that they cover various modifications and similar arrangements be included within the spirit and scope of the present disclosure, the scope of which should be accorded the broadest interpretation so as to encompass all such modifications and similar structures.

What is claimed is:

1. A charging method, comprising:
    setting an initial cut-off voltage and an initial charging current of a battery when the battery is subjected to constant current charging, wherein the initial cut-off voltage is greater than a safe cut-off voltage of the battery, and a difference between the initial cut-off voltage and the safe cut-off voltage is less than or equal to a preset voltage difference;
    detecting a battery voltage of the battery;
    determining whether a present value of the battery voltage is equal to the initial cut-off voltage; and
    gradually decreasing the initial cut-off voltage and the initial charging current when the present value of the battery voltage is equal to the initial cut-off voltage, until the initial cut-off voltage is less than or equal to the safe cut-off voltage, and then the battery is subjected to a constant voltage charging, wherein a voltage of the constant voltage charging is the safe cut-off voltage.

2. The charging method according to claim 1, wherein gradually decreasing the initial cut-off voltage and the initial charging current until the initial cut-off voltage is less than or equal to the safe cut-off voltage, and then the battery is subjected to the constant voltage charging, comprises:
    decreasing the initial cut-off voltage by a first preset value to function as a present cut-off voltage, and decreasing the initial charging current by a second preset value to function as a present charging current.

3. The charging method according to claim 1, wherein the method further comprises:
    continuously determining whether the present value of the battery voltage is equal to the initial cut-off voltage when the present value of the battery voltage is unequal to the initial cut-off voltage.

4. The charging method according to claim 2, wherein the difference between the initial cut-off voltage and the safe cut-off voltage is K times of the first preset value, where K is a positive integer.

5. The charging method according to claim 1, wherein setting the initial cut-off voltage and the initial charging current of the battery comprises:
    detecting the safe cut-off voltage of the battery;
    setting the initial cut-off voltage of the battery based on a mapping relationship between the safe cut-off voltage and the initial cut-off voltage; and
    setting the initial charging current of the battery based on a mapping relationship between the initial cut-off voltage and the initial charging current.

6. The charging method according to claim 2, wherein the method further comprises:
    continuously determining whether the present value of the battery voltage is equal to the present cut-off voltage when the present value of the battery voltage is unequal to the present cut-off voltage.

7. An apparatus comprising:
    a processor, a memory, and a battery, wherein the memory is configured to store executable program instructions;
    the processor configured to execute the executable program instructions performing following operations:
    setting an initial cut-off voltage and an initial charging current of a battery when the battery is subjected to constant current charging, wherein the initial cut-off voltage is greater than a safe cut-off voltage of the battery;
    determining whether a present value of a battery voltage of the battery is equal to the initial cut-off voltage; and
    gradually decreasing the initial cut-off voltage and the initial charging current when the present value of the battery voltage is equal to the initial cut-off voltage, until the initial cut-off voltage is less than or equal to the safe cut-off voltage, and then the battery is subjected to a constant voltage charging, wherein a voltage of the constant voltage charging is the safe cut-off voltage.

8. The apparatus according to claim 7, wherein gradually decreasing the initial cut-off voltage and the initial charging current until the initial cut-off voltage is less than or equal to the safe cut-off voltage, and then the battery is subjected to the constant voltage charging, comprises that the processor is configured to execute the executable program instructions performing following operations:
    decreasing the initial cut-off voltage by a first preset value to function as a present cut-off voltage, and decreasing the initial charging current by a second preset value to function as a present charging current.

9. The apparatus according to claim 7, wherein the processor is configured to execute the executable program instructions performing following operation:
    continuously determine whether the present value of the battery voltage is equal to the initial cut-off voltage when the present value of the battery voltage is unequal to the initial cut-off voltage.

10. The apparatus according to claim 8, wherein the difference between the initial cut-off voltage and the safe cut-off voltage is K times of the first preset value, where K is a positive integer.

11. The apparatus according to claim 7, wherein the processor is configured to set the initial cut-off voltage and the initial charging current of the battery comprising:
    detecting the safe cut-off voltage of the battery;

setting the initial cut-off voltage of the battery based on a mapping relationship between the safe cut-off voltage and an initial cut-off voltage; and setting the initial charging current of the battery based on a mapping relationship between the initial cut-off voltage and the initial charging current.

12. The apparatus according to claim 8, wherein the processor is configured to execute the executable program instructions performing following operation:

continuously determine whether the present value of the battery voltage is equal to the present cut-off voltage when the present value of the battery voltage is unequal to the present cut-off voltage.

13. The charging method according to claim 2, wherein gradually decreasing the initial cut-off voltage and the initial charging current until the initial cut-off voltage is less than or equal to the safe cut-off voltage, and then the battery is subjected to the constant voltage charging, further comprises:

determining whether the present cut-off voltage is greater than the safe cut-off voltage;

determining whether the present value of the battery voltage is equal to the present cut-off voltage when the present cut-off voltage is greater than the safe cut-off voltage; and decreasing the present cut-off voltage by the first preset value to function as a new present cut-off voltage and decreasing the present charging current by the second preset value to function as a new present charging current when the present value of the battery voltage is equal to the present cut-off voltage, and determining whether the present cut-off voltage is greater than the safe cut-off voltage until the present cut-off voltage is less than or equal to the safe cut-off voltage, and then the battery is subjected to the constant voltage charging.

14. The apparatus according to claim 7, wherein a difference between the initial cut-off voltage and the safe cut-off voltage is less than or equal to a preset voltage difference.

15. The apparatus according to claim 8, wherein gradually decreasing the initial cut-off voltage and the initial charging current until the initial cut-off voltage is less than or equal to the safe cut-off voltage, and then the battery is subjected to the constant voltage charging, comprises that the processor is configured to execute the executable program instructions performing following operations:

determining whether the present cut-off voltage is greater than the safe cut-off voltage;

determining whether the present value of the battery voltage is equal to the present cut-off voltage when the present cut-off voltage is greater than the safe cut-off voltage; and decreasing the present cut-off voltage by the first preset value to function as a new present cut-off voltage and decreasing the present charging current by the second preset value to function as a new present charging current when the present value of the battery voltage is equal to the present cut-off voltage, and determining whether the present cut-off voltage is greater than the safe cut-off voltage until the present cut-off voltage is less than or equal to the safe cut-off voltage, and then the battery is subjected to the constant voltage charging.

16. A charging method, comprising:

setting a first cut-off voltage and a charging current of a battery when the battery is subjected to constant current charging, wherein the first cut-off voltage is greater than a second cut-off voltage of the battery;

determining that a present value of a battery voltage of the battery is equal to the first cut-off voltage; and decreasing the first cut-off voltage and the charging current, until the first cut-off voltage is less than or equal to the second cut-off voltage, and then the battery is subjected to a constant voltage charging using the second cut-off voltage.

17. The charging method according to claim 16, wherein decreasing the first cut-off voltage and the charging current, until the first cut-off voltage is less than or equal to the second cut-off voltage, and then the battery is subjected to the constant voltage charging using the second cut-off voltage, comprises:

decreasing the first cut-off voltage by a first preset value to function as a present cut-off voltage, and decreasing the charging current by a second preset value to function as a present charging current;

determining that the present cut-off voltage is greater than the second cut-off voltage;

determining that the present value of the battery voltage is equal to the present cut-off voltage; and decreasing the present cut-off voltage by the first preset value to function as a new present cut-off voltage and decreasing the present charging current by the second preset value to function as a new present charging current when the present value of the battery voltage is equal to the present cut-off voltage, and performing the constant voltage charging of the battery by determining that the present cut-off voltage is less than or equal to the second cut-off voltage.

18. The charging method according to claim 17, wherein the difference between the first cut-off voltage and the second cut-off voltage is K times of the first preset value, where K is a positive integer.

19. The charging method according to claim 16, wherein setting the first cut-off voltage and the charging current of the battery comprises:

detecting the second cut-off voltage of the battery;

setting the first cut-off voltage of the battery based on a mapping relationship between the second cut-off voltage and the first cut-off voltage; and setting the charging current of the battery based on a mapping relationship between the first cut-off voltage and the charging current.

20. The charging method according to claim 16, wherein a difference between the initial cut-off voltage and the safe cut-off voltage is less than or equal to a preset voltage difference.

* * * * *